(12) United States Patent
Jüstel et al.

(10) Patent No.: US 6,184,618 B1
(45) Date of Patent: Feb. 6, 2001

(54) LUMINESCENT MATERIAL

(75) Inventors: Thomas Jüstel; Hans Nikol; Cornelis R. Ronda, all of Aachen (DE); Johannes T. W. De Hair, Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/205,973

(22) Filed: Dec. 4, 1998

(30) Foreign Application Priority Data

Dec. 19, 1997 (EP) .................................................. 97204031
Jun. 22, 1998 (EP) .................................................. 98202063

(51) Int. Cl.$^7$ .................................................. H01J 29/10
(52) U.S. Cl. ........................... 313/463; 313/486; 313/487
(58) Field of Search .................................... 313/487, 463, 313/467, 485, 486; 252/301.4 P, 301.4 R, 302.4 S, 301.4 S

(56) References Cited

U.S. PATENT DOCUMENTS

| | | | |
|---|---|---|---|
| 4,703,224 | 10/1987 | Rattray et al. | 313/487 |
| 4,933,600 | * 6/1990 | Endres | 313/487 |
| 5,166,456 | * 11/1992 | Yoshino | 252/301.4 |

\* cited by examiner

Primary Examiner—Nimeshkumar D. Patel
Assistant Examiner—Todd Reed Hopper
(74) Attorney, Agent, or Firm—F. Brice Faller

(57) ABSTRACT

The invention relates to a luminescent material of general formula $$(Ba_xSr_{1-x-y}Pb_y)_2Mg(BO_3)_2$$

wherein $0 \leq x \leq 0.999$, $0.0005 < y < 0.05$.
Luminescent materials of this general formula are very suitable for use in low pressure mercury discharge lamps for tanning purposes.

6 Claims, No Drawings

LUMINESCENT MATERIAL

BACKGROUND OF THE INVENTION

The invention relates to a luminescent material, a luminescent screen and a low pressure mercury lamp comprising such a luminescent screen. The invention also relates to a method for preparing the luminescent material.

In U.S. Pat. No. 4,703,224 a low pressure mercury discharge lamp for tanning purposes is disclosed comprising a luminescent screen containing, in addition to a UV-B phosphor, $Sr_2P_2O_7:Eu^{2+}$ and $Ba_2P_2O_7:Eu^{2+}$ as UV-A phosphors. This composition of the luminescent screen allowed the low pressure mercury discharge lamp (further also called lamp) to simulate the spectrum of the sun in the UV-region. A disadvantage of the used luminescent materials, however, is the fact that they both absorb radiation with a wavelength between 280 nm and 350 nm relatively strongly. As a result the short-wavelength radiation generated by the luminescent screen is to a relatively large extent reabsorbed and converted into long-wavelength radiation. The amount of short-wavelength radiation reabsorbed by the luminescent screen is a very strong function of its thickness. For this reason thickness variations in the luminescent screen along the lamp vessel of the lamp cause relatively large differences between the spectra of the light emitted from different places on the surface of the lamp vessel.

SUMMARY OF THE INVENTION

The invention aims to provide a luminescent material mainly emitting in the UV-A region of the spectrum that has a low absorption of short-wave radiation and is therefore very suitable for use in the luminescent screen of a low pressure mercury discharge lamp for tanning purposes.

A luminescent material according to the invention is of general formula $$(Ba_xSr_{1-x-y}Pb_y)_2Mg(BO_3)_2$$

wherein $0 \leq x < 0.999$, $0.0005 \leq y \leq 0.05$.

DETAILED DESCRIPTION OF THE PREFERRED EMBODIMENTS

It has been found that a luminescent material according to the invention has its main emission between 370 nm and 390 nm and absorbs only a relatively small amount of radiation between 280 nm and 350 nm. In case the Sr content of the luminescent material according to the invention is increased, the maximum of the emission band is shifted to a shorter wavelength which results in a smaller amount of absorption of radiation between 280 nm and 350 nm. Table 1 shows the emission maximum EM, the full width at half maximum FWHM and the absorption coefficient $AQ_{254}$ of a luminescent material according to the invention for different values of x when y=0.005. Table 2 shows the emission maximum EM, the full width at half maximum FWHM, the absorption coefficient $AQ_{254}$ and the quantum efficiency QE for different values of y of a luminescent material according to the invention for different values of y when the luminescent material contains no Sr.

It has also been found that a close simulation of the UV-spectrum of sunlight can be obtained for low pressure mercury discharge lamps with a luminescent screen that comprises, apart from a luminescent material according to the invention, for instance lanthanum phosphate activated with cerium and barium silicate activated with lead.

A luminescent material according to the invention can be prepared by means of a method comprising the following steps:

mixing of $BaCO_3$, $SrCO_3$, MgO, $H_3BO_3$ and PbO, heating the obtained mixture in an oxygen containing atmosphere, and grinding the resulting material. Preferably the last two steps of the method are repeated. It has been found that good results are obtained in case the heating is done at 900 C.

In a typical example a luminescent material not containing Sr was prepared by mixing $BaCO_3$, MgO, $H_3BO_3$ and PbO in an agate mortar. The mixture was subsequently heated in an oxygen containing atmosphere, and ground. The last two steps of this preparation method were repeated and the resulting luminescent material was stored in a dry container.

TABLE 1

| x | EM(nm) | FWHM(nm) | $AQ_{254}$ (%) |
|---|--------|----------|----------------|
| 1.0 | 380 | 53 | 83 |
| 0.75 | 375 | 59 | 94 |
| 0.5 | 362 | 62 | 93 |
| 0.25 | 346 | 77 | 88 |
| 0.0 | 340 | 57 | 85 |

TABLE 2

| y | EM(nm) | FWHM(nm) | QE (%) | $AQ_{254}$ (%) |
|---|--------|----------|--------|----------------|
| 0.005 | 380 | 53 | 63 | 80 |
| 0.01 | 380 | 53 | 60 | 83 |
| 0.02 | 380 | 53 | 50 | 90 |

What is claimed is:

1. Luminescent material of general formula $$(Ba_xSr_{1-x-y}Pb_y)_2Mg(BO_3)_2$$

wherein $0 \leq x \leq 0.999$, $0.0005 \leq y \leq 0.05$.

2. Luminescent screen comprising a luminescent material of the general formula $$(Ba_xSr_{1-x-y}Pb_y)_2Mg(BO_3)_2$$

wherein $0 \leq x \leq 0.999$, $0.0005 \leq y \leq 0.05$.

3. Low pressure mercury discharge lamp provided with a luminescent screen as claimed in claim 2.

4. Method for preparing a luminescent material of the general formula $$(Ba_xSr_{1-x-y}Pb_y)_2Mg(BO_3)_2$$

wherein $0 \leq x \leq 0.999$, $0.0005 \leq y \leq 0.05$, comprising the following steps:

mixing of $BaCo_3$, $SrCo_3$, MgO, $H_3BO_3$ and Pbo, heating the obtained mixture in an oxygen containing atmosphere, and grinding the resulting material.

5. Method according to claim 4, wherein the last two steps of the method are repeated.

6. Method according to claim 4, wherein the heating is done at 900 C.

* * * * *